United States Patent
Jiang et al.

(10) Patent No.: US 11,110,513 B2
(45) Date of Patent: Sep. 7, 2021

(54) COMBINED ULTRASONIC MICRO-FORGING DEVICE FOR IMPROVING MICROSTRUCTURE AND MECHANICAL PROPERTIES OF ADDITIVE MANUFACTURED METAL PARTS, AND A RELATED ADDITIVE MANUFACTURING METHOD

(71) Applicants: HARBIN ENGINEERING UNIVERSITY, Harbin (CN); HATRAN MANUFACTURE SCIENCE INSTITUTE(YANTAI) CO., LTD., Yantai (CN)

(72) Inventors: Fengchun Jiang, Harbin (CN); Yuanping Chen, Hangzhou (CN); Ding Yuan, Harbin (CN); Dacheng Hua, Hangzhou (CN); Chunhuan Guo, Harbin (CN)

(73) Assignees: HARBIN ENGINEERING UNIVERSITY, Harbin (CN); HATRAN MANUFACTURE SCIENCE INSTITUTE(YANTAI) CO., LTD., Yantai (CN)

( * ) Notice: Subject to any disclaimer, the term of this patent is extended or adjusted under 35 U.S.C. 154(b) by 0 days.

(21) Appl. No.: 16/641,176

(22) PCT Filed: Dec. 12, 2017

(86) PCT No.: PCT/CN2017/115700
§ 371 (c)(1),
(2) Date: Feb. 21, 2020

(87) PCT Pub. No.: WO2019/037338
PCT Pub. Date: Feb. 28, 2019

(65) Prior Publication Data
US 2020/0215614 A1 Jul. 9, 2020

(30) Foreign Application Priority Data
Aug. 22, 2017 (CN) .......................... 201710725336.8

(51) Int. Cl.
B22F 3/24 (2006.01)
B21J 5/00 (2006.01)
(Continued)

(52) U.S. Cl.
CPC .................. B22F 3/24 (2013.01); B06B 3/00 (2013.01); B21J 5/006 (2013.01); B22F 3/105 (2013.01);
(Continued)

(58) Field of Classification Search
CPC ........ B22F 3/24; B22F 3/105; B22F 2202/01; B22J 5/006; B21J 5/006; B06B 3/00
See application file for complete search history.

(56) References Cited

U.S. PATENT DOCUMENTS 6,519,500 B1 * 2/2003 White .................... B33Y 80/00
700/119
6,685,365 B2 * 2/2004 White .................. G02B 6/3636
385/102
(Continued)

FOREIGN PATENT DOCUMENTS

CN 101130828 A * 2/2008
CN 101130828 A 2/2008
(Continued)

OTHER PUBLICATIONS

Machine Translation CN10452944A (Year: 2015).*
(Continued)

Primary Examiner — Matthew J Daniels
Assistant Examiner — Wayne K. Swier
(74) Attorney, Agent, or Firm — Reising Ethington PC

(57) ABSTRACT

A combined ultrasonic micro-forging device and a related additive manufacturing method for improving the micro-
(Continued)

structure and mechanical properties of additive manufactured metal part. The device comprises a transducer, a pneumatic sliding table, a pneumatic sliding table connecting frame, an amplitude transformer, a tool head and a roller, wherein the transducer is provided in a transducer housing, a socket connector and a pipeline connector are provided on the transducer housing, the amplitude transformer is connected under the transducer, the tool head is connected under the transducer, the roller is located between the tool head and workpiece, and the pneumatic sliding table is connected to the transducer housing and the amplitude transformer via the pneumatic sliding table connecting frame. The ultrasonic micro-forging device of high frequency ultrasonic impact and larger deformation produced by mechanical rolling, thereby generating a composite action of ultrasonic impact and continuous rolling micro-forging.

7 Claims, 1 Drawing Sheet

(51) Int. Cl.
  B22F 3/105       (2006.01)
  B06B 3/00        (2006.01)
  B33Y 30/00       (2015.01)
  B33Y 10/00       (2015.01)
  B33Y 70/00       (2020.01)
  B33Y 40/20       (2020.01)
(52) U.S. Cl.
  CPC ........... *B33Y 30/00* (2014.12); *B22F 2202/01* (2013.01); *B22F 2998/00* (2013.01); *B33Y 10/00* (2014.12); *B33Y 40/20* (2020.01); *B33Y 70/00* (2014.12)

(56) References Cited

U.S. PATENT DOCUMENTS

| | | | | |
|---|---|---|---|---|
| 6,814,823 | B1* | 11/2004 | White | B23K 20/103 156/73.1 |
| 9,302,338 | B2 | 4/2016 | Zhang et al. | |
| 2005/0173380 | A1* | 8/2005 | Carbone | B23K 26/34 219/121.31 |
| 2005/0220921 | A1* | 10/2005 | Olsson | B30B 11/022 425/352 |
| 2007/0295440 | A1* | 12/2007 | Stacker | B23K 20/10 156/73.1 |
| 2011/0220292 | A1* | 9/2011 | Short | B32B 37/00 156/580.1 |
| 2014/0041504 | A1* | 2/2014 | Schwartz | B26D 3/08 83/880 |
| 2015/0314373 | A1* | 11/2015 | Mironets | B22F 10/40 419/30 |
| 2015/0337405 | A1* | 11/2015 | Panda | C21D 1/09 148/516 |
| 2016/0031010 | A1* | 2/2016 | O'Neill | B29C 64/153 419/28 |

FOREIGN PATENT DOCUMENTS

| | | | | | |
|---|---|---|---|---|---|
| CN | 101817121 | A | * | 9/2010 | ........... B23K 10/006 |
| CN | 101817121 | A | | 9/2010 | |
| CN | 104525944 | A | * | 4/2015 | |
| CN | 104525944 | A | | 4/2015 | |
| CN | 105838863 | A | * | 8/2016 | ............. B33Y 30/00 |
| CN | 105838863 | A | | 8/2016 | |
| CN | 205826022 | U | * | 12/2016 | |
| CN | 106283038 | A | | 1/2017 | |
| DE | 102012103548 | A1 | * | 10/2013 | .......... B25J 15/0019 |
| DE | 102012103548 | A1 | | 10/2013 | |
| WO | WO2013105369 | A1 | | 7/2013 | |

OTHER PUBLICATIONS

Machine Translation CN205826022U (Year: 2016).*
Machine Translation CN101130828A(Year: 2008).*
Machine Translation DE102012103548A1 (Year: 2013).*
Machine Translation CN104525944A (Year: 2015).*
Machine Translation CN105838863A (Year: 2016).*
Friel, Chapter 13 Power ultrasonics for additive manufacturing and consolidating of materials § 13.2 Ultrasonic additive manufacturing, From: Power Ultrasonics, Applications of High-intensity Ultrasound, edited by Gallego-Juarez, Graff (Year: 2015).*
Machine Translation CN101817121A (Year: 2010).*
Paul A. Colegrove et al., Microstructure and residual stress improvement in wire and arc additively manufactured parts through high-pressure rolling; Journal of Materials Processing Technology, 2013 213(10): 1782-1791.
Filomeno Martina et al. Microstructure of Interpass Rolled Wire + Arc Additive Manufacturing Ti-6 Al-4V Components; Metallurgical and Materials Transactions A, 2015, 46(12): 6103-6118.
Jianglong Gu et al.; The effect of inter-layer cold working and post-deposition heat treatment on porosity in additively manufactured aluminum alloys; Journal of Materials Processing Technology, 2016, 230: 26-34.
Jianglong Gu et al.; The strengthening effect of inner-layer cold working and post-deposition heat treatment on the additively manufactured Al-6.3Cu alloy; Materials Science and Engineering: A, 2016, 651: 18-26.
J. Donoghue et al.; The effectiveness of combining rolling deformation with Wire-Arc Additive Manufacture on β-grain refinement and texture modification in Ti-6Al-4V; Materials Characterization, 2016, 114: 103-114.
F. Martina et al.; Residual stress of as-deposited and rolled wire+ arc additive manufacturing Ti-6Al-4V components; Materials Science and Technology, 2016, 32(14): 1439-1448.
M. A. Vasylyev et. al,; Ultrasonic impact treatment induced oxidation of Ti6Al4V alloy; Acta Materialia, 2016, 103: 761-774.
Yuliang Zhao et. al.; Effect of Ultrasonic vibration and applied pressure on the microstructure and mechanical property of Al-5.0Cu-o.6Mn-0.6Fe alloys; Materials Science Forum. 2016 850: 559-565.
B. N. Mordyuk; Effect of structure evolution induced by ultrasonic peening on the corrosion behavior of AISI-321 stainless steel; Materials Science and Engineering: 2007, 458(1): 253-261.
Bohdan Mordyuk et, al.; Ultrasonic impact peening for the surface properties management; Journal of Sound and Vibration, 2007, 308(3): 855-866.
Chang-Min Suh et. al.; Fatigue and mechanical characteristics of nano-structured tool steel by ultrasonic cold forging technology; Materials Science and Engineering: A, 2007, 443(1): 101-106.
Yu. N. Petrov et. al; Influence of microstructural modifications induced by ultrasonic impact treatment on hardening and corrosion behavior of wrought Co—Cr—Mo biomedical alloy; Materials Science and Engineering: C, 2016, 58: 1024-1035.
M.A. Vasylyev et. al.; Nitridation of Ti-6Al-4V alloy under ultrasonic impact treatment in liquid nitrogen; Acta Materialia, 2012, 60(17): 6223-6233.
Li Yong, Affect of High-Frequency Forging on Stress Field of Laser Cladding Layer [D]. University of South China, 2012.
Yu Jinshui; Affect of High-Frequency Micro-Forging on Mechanical Performance of Laser-Shaped 304 Stainless Steel Test Piece [D]. University of South China, 2012.
Qi Yong'Ai; Research on Laser Rapid Formation Nickel-Based High-Temperature Alloy Reinforcement Technology based on Ultrasonic Impact Treatment [D]. Nanjing University of Aeronautics and Astronautics, 2014.
International Search Report and Written Opinion Issued for PCT/CN2017/115700.
First office action issued by the National Intellectual Property Administration of People's Republic of China for application CN201710725336.8 dated Jul. 18, 2018.
English Translation of the First office action issued by the National Intellectual Property Administration of People's Republic of China for application CN201710725336.8 dated Jul. 18, 2018.

(56) References Cited

OTHER PUBLICATIONS

Second office action issued by the National Intellectual Property Administration of People's Republic of China for application CN201710725336.8 dated Feb. 26, 2019.

English Translation of the second office action issued by the National Intellectual Property Administration of People's Republic of China for application CN201710725336.8 dated Feb. 26, 2019.

* cited by examiner

COMBINED ULTRASONIC MICRO-FORGING DEVICE FOR IMPROVING MICROSTRUCTURE AND MECHANICAL PROPERTIES OF ADDITIVE MANUFACTURED METAL PARTS, AND A RELATED ADDITIVE MANUFACTURING METHOD

CROSS-REFERENCE TO RELATED APPLICATION

This application claims the benefit of CN Application No. 201710725336.8 filed on Aug. 22, 2017, titled "A COMBINED ULTRASONIC MICRO-FORGING DEVICE FOR IMPROVING MICROSTRUCTURE AND MECHANICAL PROPERTIES OF ADDITIVE MANUFACTURED METAL PARTS, AND A RELATED ADDITIVE MANUFACTURING METHOD", which is incorporated herein by reference in its entirety.

FIELD

The present application relates to a metal additive manufacturing device and a related metal additive manufacturing method, and in particular, to a combined ultrasonic micro-forging device for improving the microstructure and mechanical properties of an additive manufactured metal part, and a related metal additive manufacturing method for the same.

BACKGROUND

At present, the additive manufacturing technology has been widely applied to fields such as casting sand mold, biomedical apparatus and polymer material, etc. However, due to the inherent characteristics of this technology, its application in the field of rapid prototyping of metal parts is limited; especially, a bottleneck is encountered when the existing high-energy beam (laser, electron beam and plasma) additive manufacturing technology is employed to manufacture a large-scale complex metal components and structural members. Because the metal additive manufacturing process has experienced a complicated physical metallurgical process, and the material melting, solidification and cooling during the forming of parts take place under extremely fast conditions within a short duration. It is inevitable that a large temperature gradient exists between the molten pool and the matrix, thus a thermal stress and a residual stress will generate, and micro-cracks tend to create, thereby lowering the toughness of the material. At the same time, the microstructures of the additive manufactured metal parts show typical cast microstructural characteristics. Additionally, as affected by various forming process parameters during the additive manufacturing process, defects such as cracks, pores, inclusion, poor interlayer bonding and spheroidization, etc., tend to generate in the metal deposition layer. The microstructure defects inside the material may cause the mechanical properties (such as toughness, strength and fatigue property, etc.) of the additive manufactured metal component to degrade, which is the main technical bottleneck affecting the application and popularization of the additive manufacturing technology in the manufacture of metal components, especially large-scale complex metal components and structural parts. Therefore, there has been an important research direction in the current metal additive manufacturing field, including how to improve the microstructure inside the material, reduce the internal defects, improve the mechanical properties of the metal component, prevent deformation and cracking by reducing and eliminating the residual stress inside the additive manufactured metal component and control both shape and performance of additive manufactured metal parts for some large-scale metal components.

At present, the primary methods and techniques to improve the microstructure and mechanical properties of additive manufacturing metal parts include post-treatment techniques, ultrasonic interference techniques, ultrasonic impact techniques and micro-rollings.

Post-treatment technique: It includes hot isostatic pressing and heat treatment technique, etc. wherein expensive large-scale devices are required, thus this post-treatment technique is difficult to process large-scale metal workpieces, the efficiency is too low, and the cost is quite high.

Ultrasonic interference technique: Before the solidification of the metal deposition layer, an ultrasonic energy field is applied from the bottom of the workpiece to the high-temperature liquid molten pool at the upper side of a workpiece, breaking the dendrites in the molten pool and increasing the nucleation rate, so as to achieve the purpose of refining grains. However, due to the limitation of the ultrasonic energy field affect depth, with the increase of the metal deposition height, the effect of improving microstructure of the deposition layer on the upper side of the parts becomes smaller and smaller. Therefore, this method is difficult to manufacture large-size complex metal components. Additionally, the deposit efficiency will be greatly affected, and the forming and manufacturing efficiencies of additive manufacturing will be reduced markedly.

Ultrasonic impact technique: the principle is that, when ultrasonic impact is applied to the solid deposition layer, it will produce plastic deformation and recrystallization so as to achieve the effect of grain refinement. However, in a traditional ultrasonic impact device, the amplitude transformer is fixed with the output terminal of a transducer, and the frequency is the same as that of the transducer, which reaches ultrasonic frequency. However, the impact pin directly contacting a workpiece is not directly connected to the end part of the amplitude transformer, instead, they are separated. The two parts are separated after the impact of pin acts, thus in fact, for the so-called ultrasonic impact device, the frequency of the traditional ultrasonic impact device is far below the high-frequency range of an ultrasonic wave. The numerous researches confirmed that the actual impact frequency of the traditional ultrasonic impact device currently used in engineering is only around a few hundred Hertz, which does not reach the 20 KHz range of ultrasonic impact frequency at all. Therefore, the effect of ultrasonic energy field on improving the microstructure and mechanical properties of metal part is still far from being achieved.

Micro-rolling: in this method, a small roller is employed to forge the metal cladding layers layer by layer, which has an obvious effect on improving the microstructure. However, the effect of eliminating the residual stress is poor, and a relatively larger pressure must be provided (for example: the refining effect of titanium alloy grain is visible when the applied pressure reaches 100 KN). In order to support the larger load, the size of the roller head is larger. Therefore, it is difficult to apply such a technique to a thin-wall part and a component part with a complex cavity. Nevertheless, due to its low cost and convenient operation, micro-rolling technique has achieved a certain progression in the metal additive manufacturing field. For example, an electron beam additive manufacturing technology and device is disclosed in US Patent Publication No. 2005/0173380, wherein a technique for improving the metal microstructure and mechanical performance employs the micro-rolling method. Arc additive manufacturing is also known, wherein micro-rolling is employed to conduct a plastic deformation treatment on a deposit layer prepared via additive manufacturing. Research shows that interlayer micro-rolling treatment may effectively refine the crystal grain, reduce the porosity inside the material and improve the performance such as hardness and intensity, etc. of the material, but the residual stress inside the material cannot be effectively eliminated. An "intelligent micro-casting and forging and milling combined manufacturing technology" has been developed, in which a plasma beam is employed as a heat source. The complex metal parts with equiaxial fine crystallization, high uniform density, high strength and toughness are achieved via 3D printing and mirco-forging. This technique greatly improves the mechanical properties and reliability of the metal additive manufactured parts, and also utilizes such a principle, it is to improve the microstructure and mechanical properties of metal parts via compressive deformation and processing applied on a fusion zone using a micro-rolling device or a micro-extruding device (see China Patent CN 101817121 A for details).

By analyzing several currently existing methods used to improve the microstructure and the mechanical properties of an additive manufactured metal component, it is found that these methods and techniques, to a certain extent, can improve the microstructure and mechanical properties of the metal parts, but each method developed until now has a certain limitation and can only be applied under a certain condition.

Some examples of published documents related to the present technology include:

[1]. Frank L. Carbone. Directed energy net shape method and apparatus: U.S. Patent 20050173380[P]. 2005-8-11;
[2]. Colegrove P A, Coules H E, Fairman J, et al. Journal of Materials Processing Technology, 2013, 213(10): 1782-1791;
[3]. Martina F, Colegrove P A, Williams S W, et al. Metallurgical and Materials Transactions A, 2015, 46(12): 6103-6118;
[4]. Gu J, Ding J, Williams S W, et al. Journal of Materials Processing Technology, 2016, 230: 26-34;
[5]. Gu J, Ding J, Williams S W, et al. Materials Science and Engineering: A, 2016, 651: 18-26;
[6]. Donoghue J, Antonysamy A A, Martina F, et al. Materials Characterization, 2016, 114: 103-114;
[7]. Martina F, Roy M J, Szost B A, et al. Materials Science and Technology, 2016, 32(14): 1439-1448;
[8]. Zhang Haiou and Wang Guilan, Fused Deposition Forming Combined Manufacturing Method for Part and Mould and Auxiliary Device Thereof: CN, 101817121.A [P]. 2010-09-01;
[9]. Zhang Haiou and Wang Guilan, Fused Deposition Forming Combined Manufacturing Method for Part and Mould and Auxiliary Device Thereof: CN, 101817121.B [P]. 2012-03-28;
[10]. Vasylyev M A, Chenakin S P, Yatsenko L F. Acta Materialia, 2016, 103: 761-774;
[11]. Zhao Y, Zhang Y, Luo Z, et al. Materials Science Forum. 2016, 850;
[12]. Mordyuk B N, Prokopenko G I, Vasylyev M A, et al. Materials Science and Engineering: A, 2007, 458(1): 253-261;
[13]. Mordyuk B N, Prokopenko G I. Journal of Sound and Vibration, 2007, 308(3): 855-866;
[14]. Suh C M, Song G H, Suh M S, et al. Materials Science and Engineering: A, 2007, 443(1): 101-106;
[15]. Petrov Y N, Prokopenko G I, Mordyuk B N, et al. Materials Science and Engineering: C, 2016, 58: 1024-1035;
[16]. Vasylyev M A, Chenakin S P, Yatsenko L F. Acta Materialia, 2012, 60(17): 6223-6233;
[17]. Li Yong, Affect of High-Frequency Forging on Stress Field of Laser Cladding Layer [D]. University of South China, 2012;
[18]. Yu Jinshui, Affect of High-Frequency Micro-Forging on Mechanical Performance of Laser-Shaped 304 Stainless Steel Test Piece [D]. University of South China, 2012;
[19]. Qi Yong'ai, Research on Laser Rapid Formation Nickel-Based High-Temperature Alloy Reinforcement Technology based on Ultrasonic Impact Treatment [D]. Nanjing University of Aeronautics and Astronautics, 2014.

SUMMARY

An object of the present application is to develop a combined ultrasonic micro-forging device for improving microstructure and mechanical properties of additive manufactured metal part, which can solve the problems of poor mechanical properties of a component part caused by the defects, coarse grain and non-uniform microstructure existing the deposited metal, and also can solve the deformation and cracking of the part caused by the residual stress inside the metal part prepared via metal additive manufacturing. The application also aims to develop an additive manufacturing method to improve the microstructure and mechanical properties of additive manufactured metal parts using a combined ultrasonic micro-forging device invented.

The combined ultrasonic micro-forging device for improving microstructure and mechanical properties of additive manufactured metal part according to the application may include: a transducer 11, a pneumatic sliding table 4, a pneumatic sliding table connecting frame 5, an amplitude transformer 10, a tool head 8 and a roller 6. The transducer 11 is provided in a transducer housing 3 provided with a socket connector 1 and a pipe joint 2. The amplitude transformer 10 is connected under the transducer 11. The tool head 8 is connected under the transducer 11. The roller 6 is located between the tool head 8 and a workpiece 7. The pneumatic sliding table 4 is connected to the transducer housing 3 and the amplitude transformer 10 via the pneumatic sliding table connecting frame 5.

The combined ultrasonic micro-forging device for improving microstructure and mechanical properties of additive manufactured metal part according to the application may further include:

1) The pneumatic sliding table connecting frame 5 is connected to the transducer housing 3 and the amplitude transformer 10 via a fixing clip 9;
2) A groove 13 is provided on the bottom of the tool head;
3) A limit stopper is provided on the bottom of the tool head 8;
4) The transducer 11, the amplitude transformer 10 and the tool head 8 are all connected via a threaded rod.

The additive manufacturing method based on the combined ultrasonic micro-forging device for improving microstructure and mechanical properties of additive manufactured metal part according to the application may include: after each layer is deposited, an ultrasonic micro-forging treatment is conducted on the layer surface.

The additive manufacturing method based on the combined ultrasonic micro-forging device for improving the microstructure and mechanical properties of additive manufactured metal part according to the application may include: after every two or more layers are deposited, an ultrasonic micro-forging treatment is conducted on the layer surface.

The application puts forward such an ultrasonic micro-forging compound method and device for improving the microstructure and mechanical properties of additive manufactured metal part. This new-developed technique can solve the problems of poor mechanical properties of the additive manufactured part caused by the defects, coarse grain and non-uniform microstructure existing in deposited metal. This technique also can solve cracking of the parts due to the residual stress inside the additive manufactured metal part, and provide technical for supporting to the popularization and application of the metal additive manufacturing technology.

The combined ultrasonic micro-forging device primarily includes: a socket connector 1, a transducer 11, a pipe joint 2, a transducer housing 3, a pneumatic sliding table 4, a pneumatic sliding table connecting frame 5, an amplitude transformer 10, a tool head 8, a roller 6 and a fixing clip 9.

The socket connector 1 is mainly configured to connect an ultrasonic wave power for transferring an electrical signal of an ultrasonic wave driving power to the transducer.

The transducer 11 is configured to convert electric energy into mechanical energy, that is, ultrasonic waves.

The pipe joint 2 is configured to connect a pipe for fluid compressed air and cool the transducer 11, thereby ensuring long-time stable operation of the transducer. When an ultrasonic device operates normally, the transducer will produce a certain amount of heat, and as the operation time increases, heat will be accumulated inside the transducer housing 3, thus the ultrasonic transducer needs to be cooled. Especially, the cooling system is inevitable for a high-power transducer that operates for a long time.

The transducer housing 3 is configured to fix the transducer 11, the socket connector 1 and the pipe joint 2, and protect the transducer.

The fixing clip 9 is configured to fix the ultrasonic impact device onto the pneumatic sliding table connecting frame 5; however, other fixing mode may also be employed, and the figure only shows one layout structure thereof.

The pneumatic sliding table 4 is configured to provide a downward pressure, drive the transducer 11 to operate downwards, and provide continuous pressure; a hydraulic device may also be employed, which can provide more stable and reliable pressure.

The pneumatic sliding table connecting frame 5 is configured to connect the sliding table and the fixing clip.

The amplitude transformer 10 is configured to amplify the ultrasonic wave generated by the ultrasonic transducer and amplify the energy of the ultrasonic wave generated by the ultrasonic transducer, that is, amplify the amplitude of the transducer. The amplitude transformer is also referred to as an amplitude modulator, which has a function of adjusting the amplitude and amplifying the amplitude.

The tool head 8 is configured to act the ultrasonic wave amplified by the amplitude transformer 10 on the roller 6, which functions as a radiation end of the ultrasonic wave. The amplitude required for operation is generated on the end face, and the ultrasonic wave energy is transferred to the roller via an ultrasonic wave output terminal 13 and then directly acted by a roller on a deposit layer prepared via additive manufacturing.

The bottom of the tool head, i.e., the ultrasonic wave output terminal 13, is machined into a groove for the mounting and limiting of the roller. The size and shape of the groove matches those of the roller 6, so that the roller 6 can roll freely on a workpiece and transfer the ultrasonic energy onto the metal deposit layer. At the same time, the tool head has a limit stopper on its bottom for preventing the roller from falling off the tool head during ultrasonic vibration.

At the same time as the roller 6 vibrates at a high frequency on the metal deposit layer, it transfers, by directly acting on and contacting the deposit layer, the ultrasonic energy to a partial plastic deformation region produced by rolling. Thus, the objects of improving the metal microstructure and mechanical properties can be attained by the combination of the ultrasonic energy field and the mechanical force coupling.

Each part may be connected in the mode below:

The socket connector 1 and the pipe joint 2 are fixed to the transducer housing via a thread;

The pneumatic sliding table 4, the pneumatic sliding table connecting frame 5 and the fixing clip 9 are connected and fixed by screws;

The fixing clip 9 is fixed to the transducer housing 3 and the amplitude transformer 10, respectively, and fastened with screws;

The transducer 11 is fixed onto the transducer housing 3 via a thread;

The transducer 11, the amplitude transformer 10 and the tool head 8 are all connected by screws.

The ultrasonic micro-forging composite technology and a combined device for improving the microstructure and mechanical properties of an additive manufactured metal part according to the application may be characterized in that: the impact pin in a traditional ultrasonic impact device is designed as a roller, and the impact head of the roller is kept directly connected to the amplitude transformer; at the same time as the small-diameter roller continuously rolls on the additive manufactured metal deposit layer, an ultrasonic energy is directly applied on each deposit layer formed during the additive manufacturing process in the form of ultrasonic frequency, thereby attaining the objects of improving the metal microstructures mechanical properties of the component.

The impact pin is designed as a roller, and the impact head is directly connected to the amplitude transformer. This will greatly improve the impact frequency and make the rolling impact frequency the same as the ultrasonic wave frequency (20 kHz).

The transducer cooling system employs a fluid (compressed air) to cool the high-power transducer, so as to ensure the long-time stable operation of the transducer.

At the same time the small-diameter roller continuously rolls on the additive manufactured deposition layer, the ultrasonic frequency impact is applied to the workpiece surface, which combines the advantages of high ultrasonic impact frequency and large deformation caused by mechanical rolling. A composite action of ultrasonic impact and continuous rolling micro-forging can be achieved, and the efficiency and action depth of combined micro-forging technique is then greatly improved.

The combination of ultrasonic and micro-rolling can increase the action efficiency and speed of the deposition layer, so that improve the forming and manufacturing speed of additive manufacturing, and overcome the disadvantages of other additive manufacturing auxiliary technologies.

The metal additive manufacturing method is available for various additive manufacturing techniques with different heat sources such as electron beam, laser, electric arc and plasma arc, etc., and the manufacture field of direct metal writing.

The metal material may be any type of metal materials: titanium alloy, alloy steel, high-temperature alloy, stainless steel, other non-ferrous metals (such as aluminum alloy, copper alloy, magnesium alloy, etc.), intermetallic compound and amorphous alloy, etc.

The shape of the metal material may be wire and powder, and various liquid metals for a direct metal writing process.

The material feeding mode during additive manufacturing process may be metal powder bed method, coaxial powder (wire) feeding, paraxial powder (wire) feeding and liquid direct metal writing, etc.

For the improvement of the microstructure and mechanical properties of additive manufactured metal part according to the invention, plastic deformation occurs in the deposited metal due to ultrasonic impact and micro-rolling, and then dynamic recovery and recrystallization process sequentially occurs, thus causing refinement and homogenization of the microstructure and curing of defects, the improvement and elimination of residual stress inside the material also enable that the deformation and cracking of metal parts is controlled effectively. As a result of the combined action, the microstructure and mechanical properties of the metal component are greatly improved.

Some of the principles and mechanisms of the application are briefly described from the following three aspects.

1. Grain Refinement

1) The grains in the stress zone of the high frequency ultrasonic impact action deforms apparently, so that the crystal grains on a partial area of the metal surface layer will be refined, thereby increasing the total area of the grain boundary and achieving a grain refining effect;

2) Under the impact of ultrasonic frequency, there is acoustic pressure (or energy field) created on the metal part surface. A local plastic deformation caused by impact is mainly in the form of dislocation motion, and concomitantly, the defect density of the metal matrix rises. As driven by the acoustic pressure of high frequency ultrasonic wave (or energy field), the dislocation can slip and merge rapidly in a short time, and the dislocation merges into a small-angle grain boundary and then develops into a new grain boundary. This is a so-called dynamic recrystallization process, which is the major contribution on grain refinement;

3) Due to the large amount of heat generated by plastic deformation, the surface of the metal deposition layer is heated up to the recovery temperature, which promotes the movement and recombination of defects (dislocation) in the grain, so as to further refine the grain.

2. Defect Curing: The high-frequency ultrasonic impact produces intense plastic deformation on the surface of the deposition layer, which can effectively promote the healing and elimination of pores and others defects, wherein the effective healing is achieved during the plastic deformation-dynamic recrystallization process.

3. Elimination of residual stress: In terms of ultrasonic wave energy input and ultrasonic impact, the high-frequency ultrasonic impacting and micro-rolling effect of the rollers on the deposition layer can generally produce a compressive stress layer within a depth of 100~1000 μm of the metal deposition layer, thus the tensile stress in the deposited layer is converted into compressive stress, and the uneven stress state is converted into a uniform compressive stress state.

In the combined ultrasonic micro-forging-impact device of the application, the impact pin in the traditional ultrasonic impact device is designed as a small roller, and the tool head is directly connected to the amplitude transformer. When the small-diameter roller continuously rolls on each deposition layer formed during the additive manufacturing process, the rolling and forging effects are therefore achieved. At the same time, the ultrasonic wave energy is directly acted on the deposit layer via small-diameter roller impact. This innovative design integrates the advantages of high frequency ultrasonic impact and large plastic deformation caused by mechanical rolling, realizes the composite effect of ultrasonic impact and continuous rolling micro-forging. It is such composite effect that greatly improves the efficiency and effective depth of micro-forging, and eliminates the special rule of dendrite crystal structure in additive manufactured metal parts, and enables that the cast microstructures generally formed in additive deposited metal is converted into forged state by layer and layer. Therefore, the grains are greatly refined and mechanical properties of the additive manufactured metal parts are enhanced due to such a composite effect. Thus, a metal component with optimized microstructure and performance can be manufactured via improvement and enhancement in a way of layer by layer. The combined device and related additive manufacturing technique invented here can be widely applied to various additive manufacturing equipments and technologies for greatly improving the metal microstructure and the mechanical properties of a component, and obtaining a high-performance metal component comparable to a forged piece. In particular, this device and related processing are particularly applicable to the forming and manufacturing of large-scale metal components in some industry fields, such as: aeronautics and astronautics, naval architecture and ocean engineering, chemical industry, nuclear power and transportation, etc. This technology may have great significance when solving the problems of deformation and cracking of a large scale complex metal part. By integrating the present device and manufacturing processes with the existing additive manufacturing technologies, the technical bottleneck of being easy to shape-controlling but difficult to performance-controlling in the existing metal additive manufacturing technologies can be solved. Therefore, the current device and related manufacturing processes may initiate an innovation and development of metal rapid formation and manufacturing technologies, and promote the popularization and application of additive manufacturing technology in the advanced manufacture fields of metal components.

DETAILED DESCRIPTION OF THE EMBODIMENTS

The invention will be further described in detail below in conjunction with the drawings and embodiments. The embodiments below are merely used for illustrating the invention, rather than limiting the scope thereof.

Figure 1:
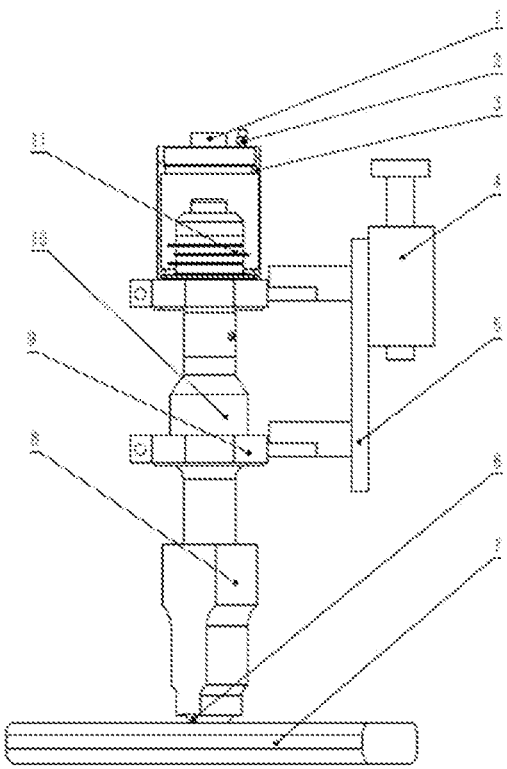
FIG. 1 is a structural representation of a combined ultrasonic micro-forging device for improving microstructure and mechanical properties of additive manufactured metal.

Referring to FIG. 1, the combined ultrasonic micro-forging device for improving the microstructure and mechanical properties of additive manufactured metal component according to the application is composed of the following parts: a socket connector 1, a pipe joint 2, a transducer housing 3, a pneumatic sliding table 4, a pneumatic sliding table connecting frame 5, a roller 6, workpiece 7, a tool head 8, a fixing clip 9, an amplitude transformer 10 and an ultrasonic transducer 11. The socket connector 1 and the pipe joint 2 are fixed onto the transducer housing 3 via a thread; the pneumatic sliding table 4 and the pneumatic sliding table connecting frame 5 are connected and fixed to the fixing clip 9 via bolts; the fixing clip 9 is respectively fixed to the transducer housing 3 and the amplitude transformer 10 via bolts; the ultrasonic transducer 11 is fixed to the transducer housing 3 via bolts; the ultrasonic transducer 11, the amplitude transformer 10 and the tool head 8 are all connected via threaded rods, and during the assembling process, each connected part needs to be tightened to prevent energy loss during operation. The tool head 8 and the amplitude transformer 10 are connected via a bolt, and it is convenient for replacing different tool heads for various operating environments.

Figures 2A, 2B, 2C:
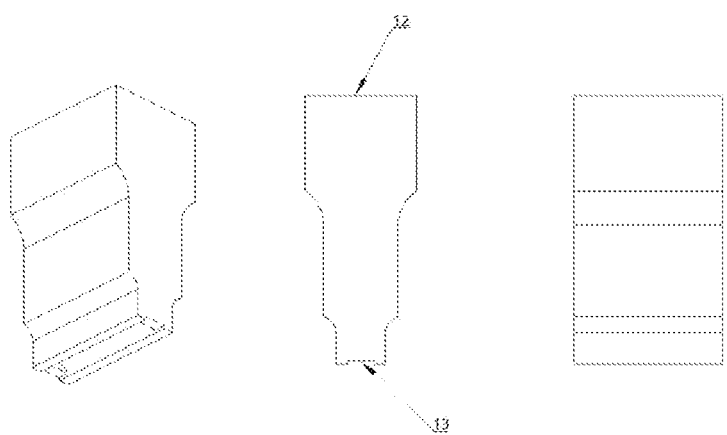
FIGS. 2a-2c are the structure diagram of a tool head.

Referring to FIGS. 2a-2c, the tool head is provided with a groove 13 on its bottom, for matching a roller, so that the roller 6 can roll freely on a workpiece, and the ultrasonic wave is transferred to the workpiece. The upper part of the tool head is a plane 12. At the same time, the tool head 8 has a limit stopper on its bottom for preventing the roller 6 from departing from the tool head 8 during operation.

During a metal additive manufacturing process, the layer-by-layer stacking formation and manufacture mode are more suitable for the application of combined ultrasonic micro-forging device.

In the manufacturing process of metal additive, ultrasonic micro-forging treatment is conducted on the surface of each layer or several layers after deposition to improve the internal structure and mechanical properties of the deposited metal. The number of deposition layers is determined according to the type of deposited metal material, the additive manufacturing process and the action depth of ultrasonic micro-forging. The action depth is related to the ultrasonic energy, the pressure provided in the rolling process and the inherent property of the material itself, etc.

After ultrasonic micro-forging, the microstructure of the metal deposited layer will be refined, or even a nano-crystalline layer can be formed, and the residual tensile stress in the deposited layer will be converted into residual compressive stress. At the same time, the defects inside the material can be effectively reduced or eliminated, and the roughness of the surface of the deposit layer may be improved to a certain degree, thereby providing a better deposition environment to the deposition of the next metal layer. With the proceeding of the process of "metal deposition-ultrasonic micro-forging-metal deposition", the overall metal microstructure and mechanical properties of the whole additive manufactured metal component part can be greatly improved.

The embodiments are provided for illustrating and describing the invention, rather than being exclusive or limiting the invention to the forms disclosed. Various modifications and variations may readily occur to those skilled in the art. The embodiments are selected and described for better illustrating the principles and practical application of the invention and helping one of ordinary skills in the art understand the invention and hence make various modified embodiments for specific use.

What is claimed is:

1. A combined ultrasonic micro-forging device for improving microstructure and mechanical properties of additive manufactured metal part, comprising: a transducer, a pneumatic sliding table, a pneumatic sliding table connecting frame, an amplitude transformer, a tool head and a roller; wherein the transducer is provided in a transducer housing, the transducer housing is provided with a socket connector and a pipe joint, the amplitude transformer is connected under the transducer, the tool head is connected under the transducer, the roller is located between the tool head and a workpiece, and the pneumatic sliding table is connected to the transducer housing and the amplitude transformer via the pneumatic sliding table connecting frame;
    wherein the pneumatic sliding table provides downward pressure, drives the transducer to operate downward, and provides continuous pressure, and wherein the roller vibrates in high frequency on a metal deposition layer when one layer is deposited, and at the same time, an ultrasonic energy is transmitted, via a direct action and a contact with the deposition layer, to a local plastic deformation area formed by rolling.

2. The combined ultrasonic micro-forging device for improving microstructure and mechanical properties of additive manufactured metal part according to claim 1, wherein the tool head is provided with a groove on its bottom.

3. The combined ultrasonic micro-forging device for improving microstructure and mechanical properties of additive manufactured metal part according to claim 2, wherein the tool head has a limit stopper on its bottom.

4. The combined ultrasonic micro-forging device for improving microstructure and mechanical properties of additive manufactured metal part according to claim 1, wherein the pneumatic sliding table connecting frame is connected to the transducer housing and the amplitude transformer via a fixing clip.

5. The combined ultrasonic micro-forging device for improving microstructure and mechanical properties of additive manufactured metal part according to claim 1, wherein the transducer, the amplitude transformer and the tool head are all connected via threaded rods.

6. The combined ultrasonic micro-forging device for improving microstructure and mechanical properties of additive manufactured metal part according to claim 4, wherein the transducer, the amplitude transformer and the tool head are all connected via threaded rods.

7. An additive manufacturing method that uses the combined ultrasonic micro-forging device for improving microstructure and mechanical properties of additive manufactured metal part according to claim 1, wherein after each layer is deposited, an ultrasonic micro-forging treatment is conducted on the layer surface.

* * * * *